Goodwin & Hawkins,
BEST AVAILABLE COPY
Patent No 14.626. Ap. 5. 56 Wind Wheel,
No. 148. A. I. Patented July 15, 1856.
(over)
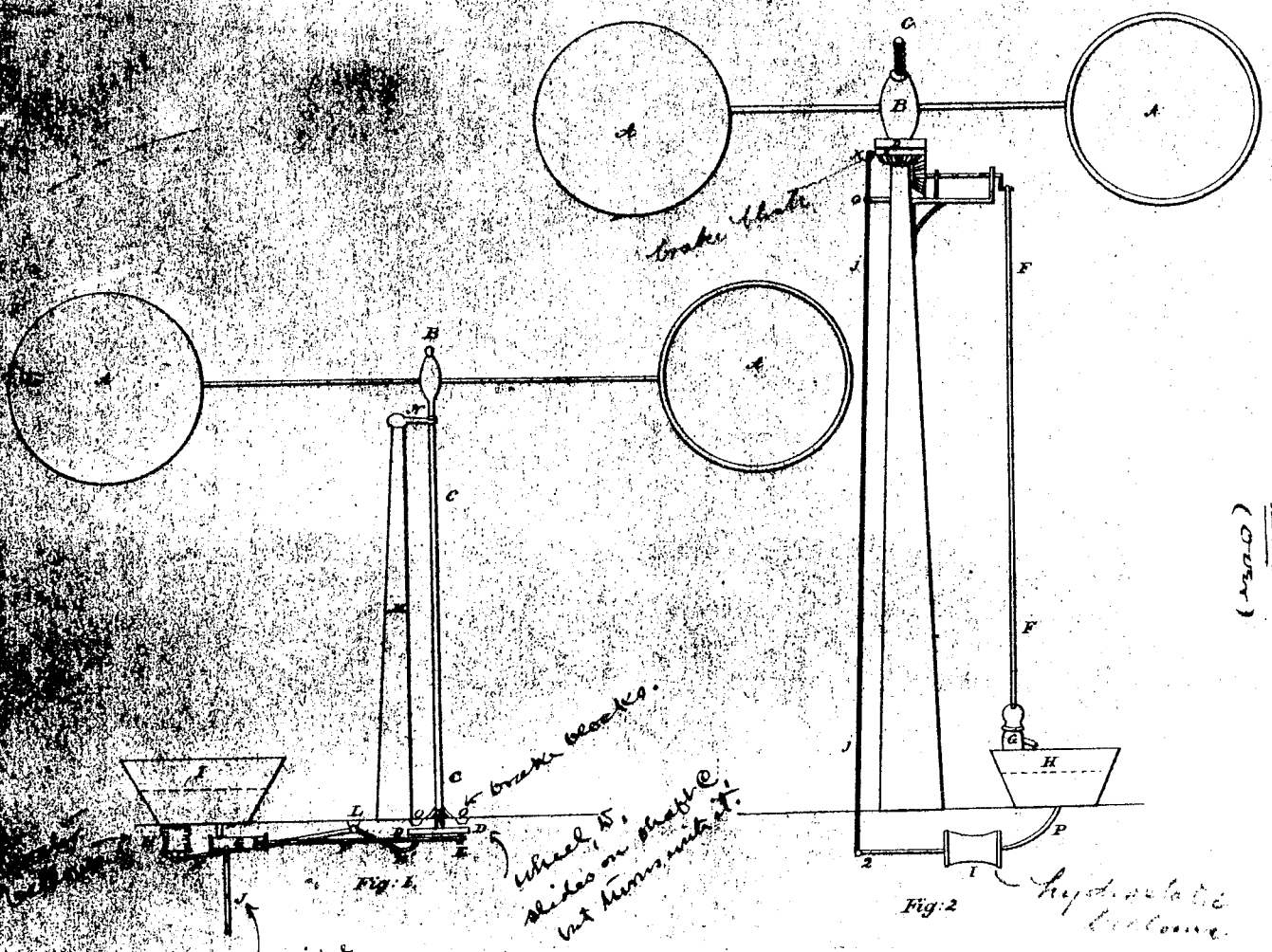
When the cistern is beam shown the column is distinct & separate
72

BEST AVAILABLE COPY

H, is a water cistern, and I, a hydraulic bellows similar to Fig 1, J. J. is the brake lever hung on on a jointed fulcrum O, and is worked by the bellows I. K, is a brake block on the end of the lever J J. and as the water cistern H is filled the bellows I, is extended, which works the lever J J and presses the brake block K against the wheel E. and stops it.

Additional improvement permitted to be added to original patent by G.P. 1837, expired by 89, 1861-